United States Patent [19]
Tsuda et al.

[11] Patent Number: 5,966,871
[45] Date of Patent: Oct. 19, 1999

[54] ACTUATOR FOR PIVOTABLE QUARTER WINDOW

[75] Inventors: Hirokazu Tsuda; Masaaki Shimizu, both of Toyohashi, Japan

[73] Assignee: ASMO Co., Ltd., Kosai, Japan

[21] Appl. No.: 08/982,507

[22] Filed: Dec. 2, 1997

[30] Foreign Application Priority Data

Dec. 3, 1996 [JP] Japan ................................. 8-323054

[51] Int. Cl.⁶ .................................................. E05F 11/00
[52] U.S. Cl. ................................................ 49/324; 49/341
[58] Field of Search ........................... 49/324, 339, 340, 49/341

[56] References Cited

U.S. PATENT DOCUMENTS

| | | |
|---|---|---|
| 4,918,865 | 4/1990 | Hirai . |
| 5,140,771 | 8/1992 | Moy et al. . |
| 5,161,419 | 11/1992 | Moy et al. . |
| 5,203,113 | 4/1993 | Yagi . |
| 5,385,061 | 1/1995 | Moy et al. . |
| 5,438,801 | 8/1995 | Ishihara et al. ..................... 49/324 X |

FOREIGN PATENT DOCUMENTS

| | | |
|---|---|---|
| 63-116678 U | 1/1987 | Japan . |
| 62-135773 U | 8/1987 | Japan . |
| 63-19684 U | 2/1988 | Japan . |
| Y2-4-7353 | 2/1992 | Japan . |
| 2 167 120 | 5/1986 | United Kingdom . |
| 2 169 652 | 7/1986 | United Kingdom . |
| 2 195 392 | 4/1988 | United Kingdom . |
| 2212591 | 7/1989 | United Kingdom . |

*Primary Examiner*—Jerry Redman
*Attorney, Agent, or Firm*—Burns, Doane, Swecker & Mathis, LLP

[57] ABSTRACT

A power window actuator including an electric motor, a reduction gear train for reducing rotational speed of the motor and a linkage mechanism connected to the gear train opens and closes a pivotable quarter window or a rear side vent. The rotation of the motor is mechanically stopped by structural members totally enclosed in a housing containing the motor and the gear train when the pivotable window comes to a fully opened or a fully closed position. An electric current supply to the motor is automatically discontinued by operation of a controller. An output shaft connected to a final stage gear of the speed reduction mechanism is extended outwardly from both sides of the housing. The linkage mechanism is composed of a pair of first links connected to the extended output shaft and a second link pivotably connected to the first links, so that the first links do not drop off from the output shaft without being fastened by a fastening member. Thus, the assembling process of the linkage mechanism is simplified.

2 Claims, 6 Drawing Sheets

ACTUATOR FOR PIVOTABLE QUARTER WINDOW

CROSS-REFERENCE TO RELATED APPLICATION

This application is based upon and claims benefit of priority of Japanese Patent Application No. Hei-8-323053 filed on Dec. 3, 1996, the content of which is incorporated herein by reference.

BACKGROUND OF THE INVENTION

1. Field of the Invention

The present invention relates to a power window actuator for a rear side vent or a rear quarter window of an automotive vehicle such as a two-door vehicle.

2. Description of Related Art

An example of a power window actuator for a pivotable quarter window of a vehicle is disclosed in Japanese utility model laid-open publication No. JP-U-63-116678. The actuator comprises an electric motor, a rotational speed reduction device and a linkage mechanism. The linkage mechanism disclosed therein has first links connected to the speed reduction mechanism and a second link connected to a connecting rod which in turn drives the pivotable window. The first and second links are rotatably connected, and the second link is disposed so that it covers and encloses the first links therein when the pivotable window is fully closed. Since the structure of the linkage mechanism is complicated, its assembling is not easy.

SUMMARY OF THE INVENTION

The present invention has been made in view of the above-mentioned problem, and an object of the present invention is to provide an actuator for a rear quarter window which has a simplified linkage mechanism, and more particularly to reduce the number of component parts used in the linkage and to simplify its assembling process, thereby reducing the production cost.

The actuator for opening and closing a pivotable window according to the present invention comprises an electric motor, a speed reduction mechanism which reduces rotational speed of the motor and transmits a rotational torque, and a linkage mechanism driven by an output shaft of the speed reduction mechanism. The linkage mechanism opens and closes the pivotable window in a pivotal fashion according to signals from a driver. When the pivotable window comes to a fully opened position or a fully closed position, the rotation of the motor is mechanically restricted and an electric power supply to the motor is automatically discontinued by an operation of a controller.

The link mechanism of the present invention is composed of a pair of first links connected to both ends of an output shaft of the speed reduction mechanism, both ends extending outward from a housing containing the motor and the reduction mechanism therein, and a second link pivotally connected to the pair of first links. The pair of the first links are slidably inserted into slits formed on the second link so that a lateral movement of the first links is restricted. Because of this structure, the first links do not drop off from the output shaft as far as the connection between the first and second links is secured. Accordingly, it is not necessary to provide members for fastening the first links to the output shaft, and the assembling process of the linkage mechanism is much simplified. Further, this structure provides a high mechanical strength for the linkage mechanism as a whole.

Other objects and features of the present invention will become more readily apparent from a better understanding of the preferred embodiment described below with reference to the following drawings.

DETAILED DESCRIPTION OF THE PREFERRED EMBODIMENT

Figure 1:
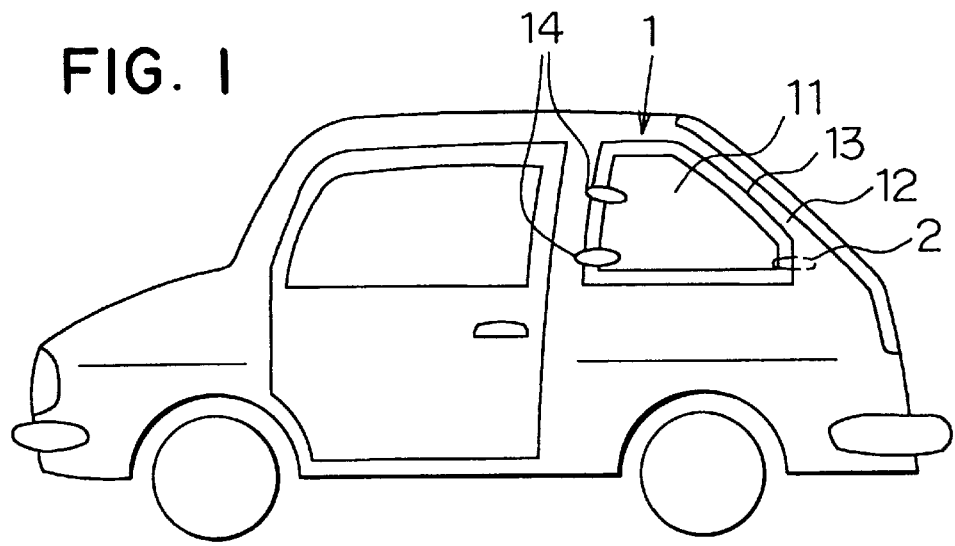
FIG. 1 shows an example of a vehicle which has a rear side vent or a rear quarter window.

A preferred embodiment according to the present invention will be described referring to the accompanying drawings. FIG. 1 shows an example of an vehicle having a rear side vent or a rear quarter window 1 (hereinafter referred to as a window). A window frame 12 of the vehicle forms an opening 11 on which a window glass 13 is mounted and pivotably connected to the window frame 12 with hinges 14 so that the window glass 13 pivotally opens or closes the opening 11. An actuator 2 for pivotally opening and closing the window glass 13 is mounted on the window frame 12 and connected to the other end of the window glass 13.

Figure 2:
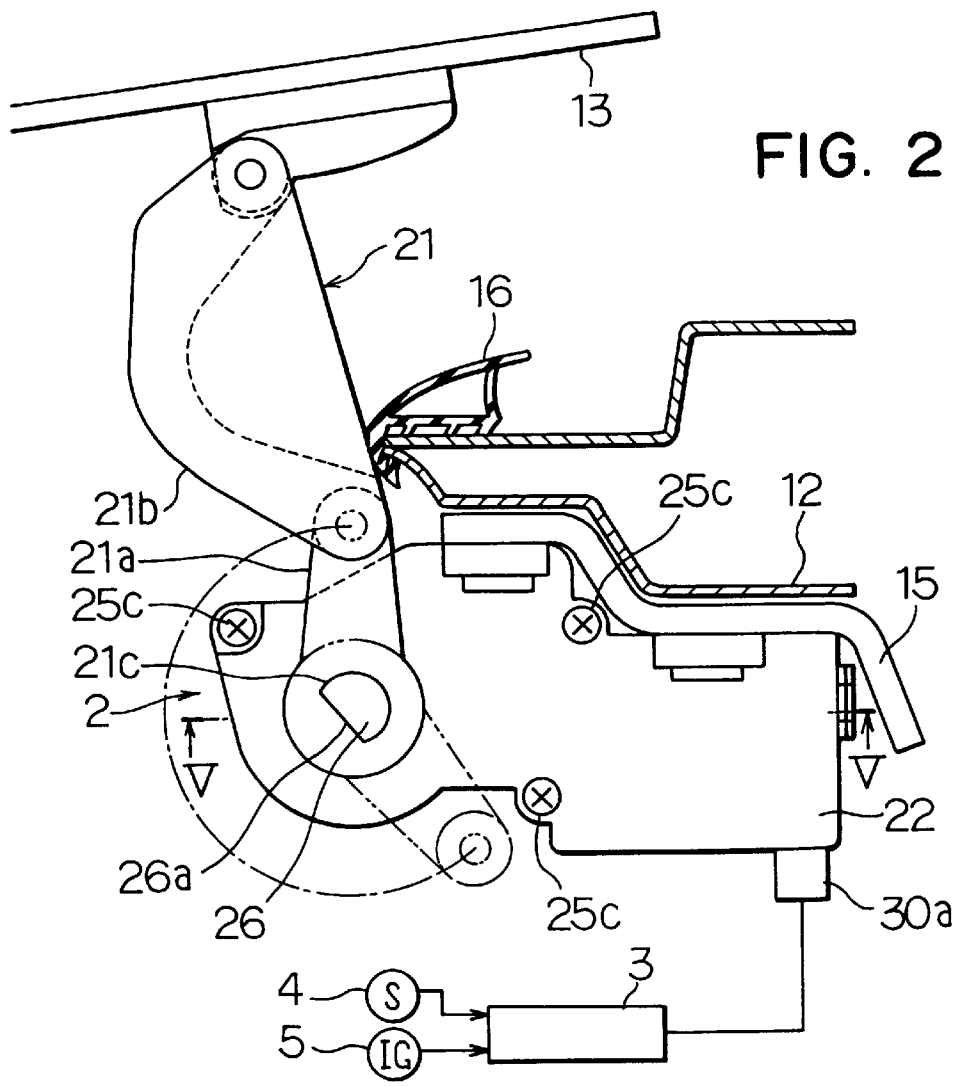
FIG. 2 is a front view showing an actuator for a rear quarter window according to the present invention.

As shown in FIG. 2, the actuator 2 is composed of a linkage mechanism 21 including a pair of first links 21a and a second link 21b and an actuator body 22 which drives the linkage mechanism 21. The actuator body 22 is fixed to the window frame 12 by means of a bracket 15. A packing or a weather strip 16 made of rubber is disposed on the window frame 12 so that the window glass 13 tightly closes the window opening 11 when the window glass 13 is brought to the closing position by the actuator 2.

Figure 3:
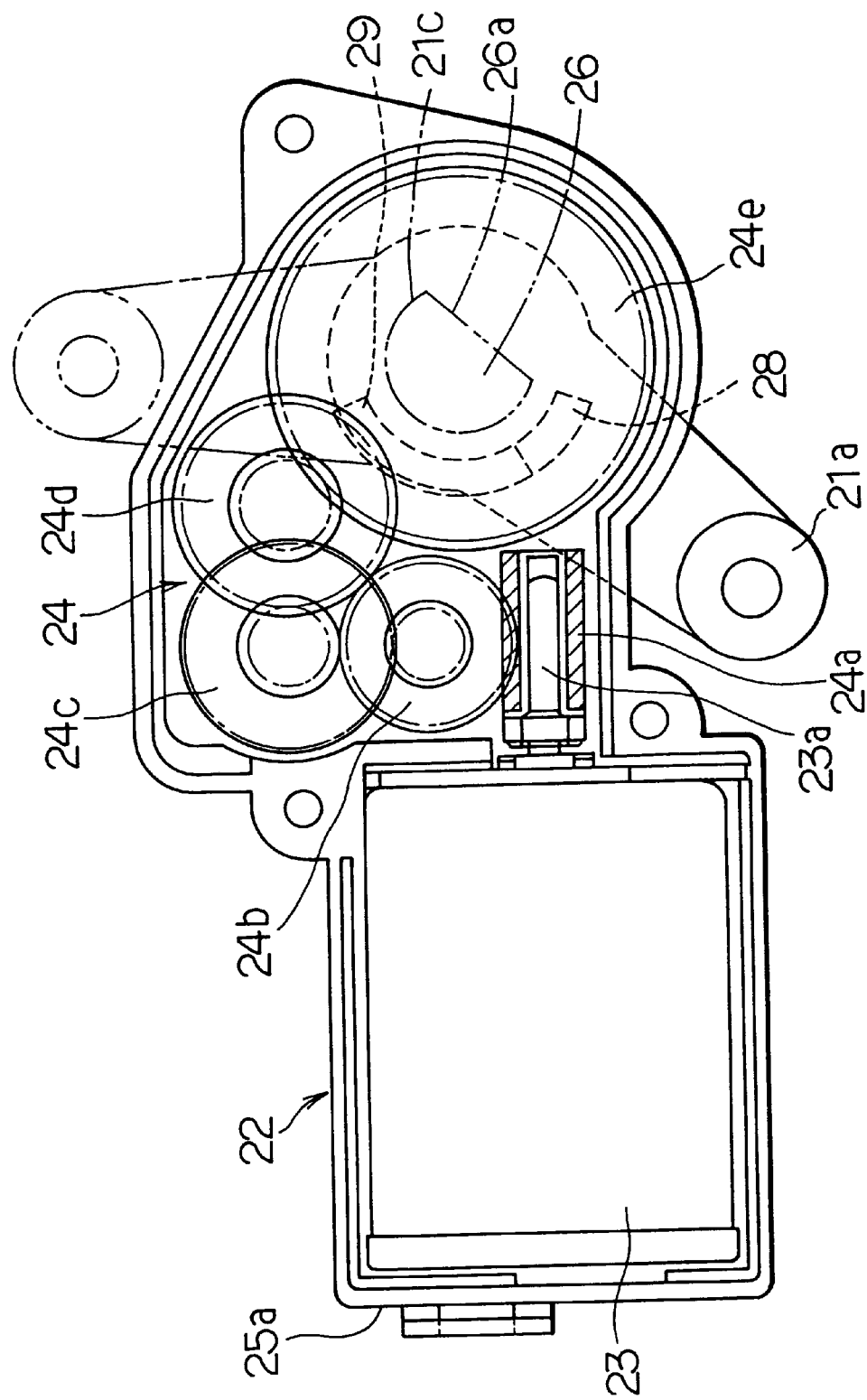
FIG. 3 is a cross-sectional view showing the actuator taken along a line III—III in FIG. 4.
Figure 4:
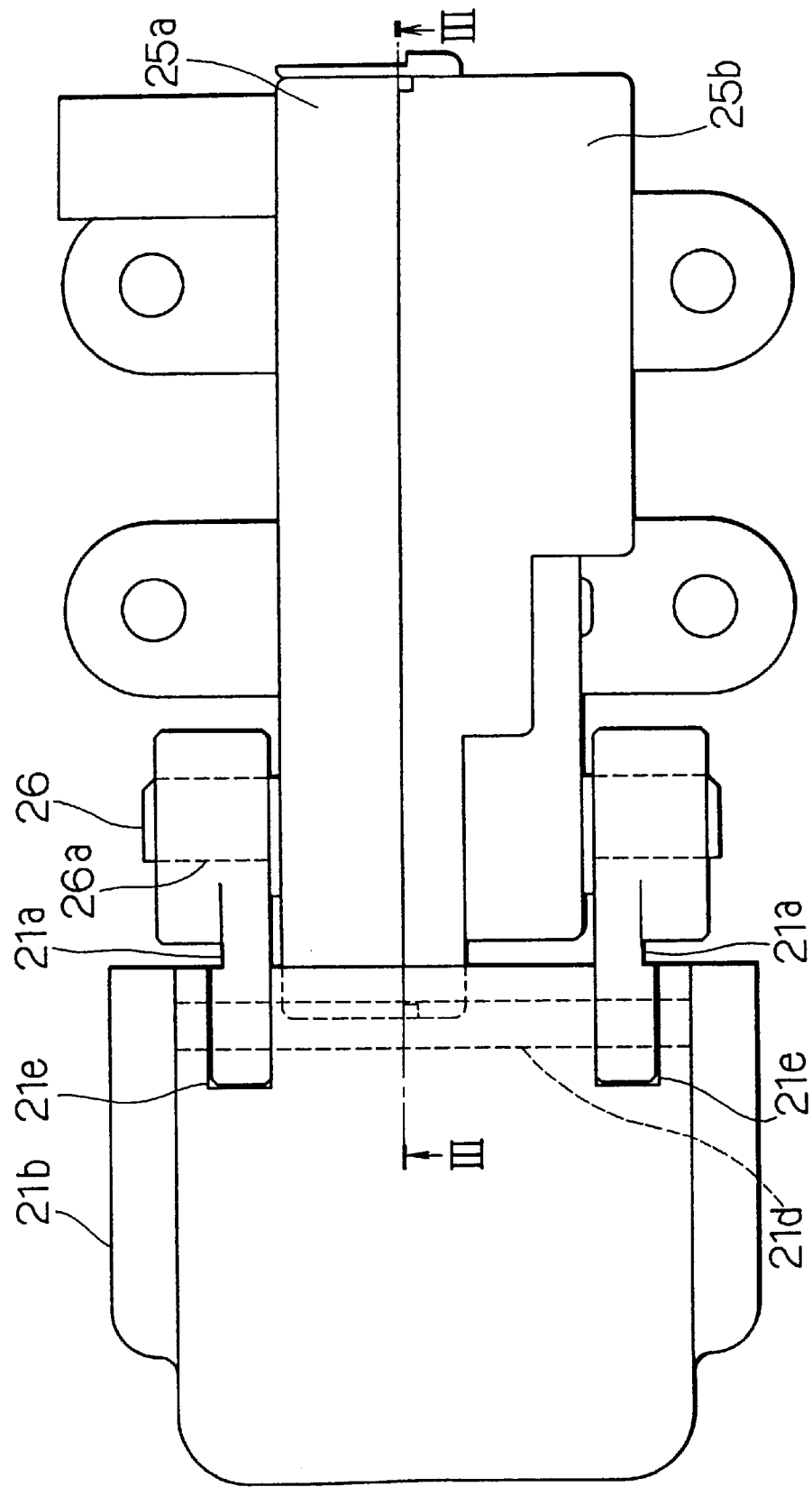
FIG. 4 is a top view showing the actuator shown in FIG. 2.

FIG. 4 shows a top view of the actuator 2, and FIG. 3 shows a cross-sectional view of the actuator 2 taken along a line III—III of FIG. 4. The actuator body 22 includes an electric motor 23 which drives the linkage mechanism 21, a speed reduction mechanism 24 which reduces a rotational speed of the motor 23 and transfers a driving torque to the linkage mechanism 21, and a pair of housings, a first housing 25a and a second housing 25b, for containing therein the motor 23 and the reduction mechanism 24. The first and second housings 25a and 25b are fastened together with screws 25.

As shown in FIG. 3, the reduction mechanism 24 is composed of a worm 24a connected to an output shaft 23a of the motor 23, a worm wheel 24b engaging with the worm 24a, and three spur gears 24c, 24d and 24e. The spur gear 24e is a final stage gear of the reduction mechanism, and an output shaft 26 connected to the first link 21a is provided on the final stage spur gear 24e integrally therewith. A linking surface 26a is provided on the output shaft 26, and a linking hole 21c is provided on the first link 21a. The output shaft 26 of the reduction mechanism and the first link 21a are connected to each other by engaging the linking surface 26a with the linking hole 21c.

As shown in FIG. 4, a pair of the first links 21a are connected, respectively, to both ends of the output shaft 26 sticking out from the housings 25a and 25b. A pair of slits 21e into which the first links 21a are inserted are provided on the second link 21b. The pair of the first links 21a and the second link 21b are connected to each other with a spring pin 21d so that the second link 21b can pivot relative to the pair of the first links 21a. The spring pin 21d is a pin having a resiliently deformable outer diameter as defined in JIS B 2808, and is fixedly inserted into holes provided on the second link 21b and rotatably inserted into holes of the first links 21a.

Figure 5:
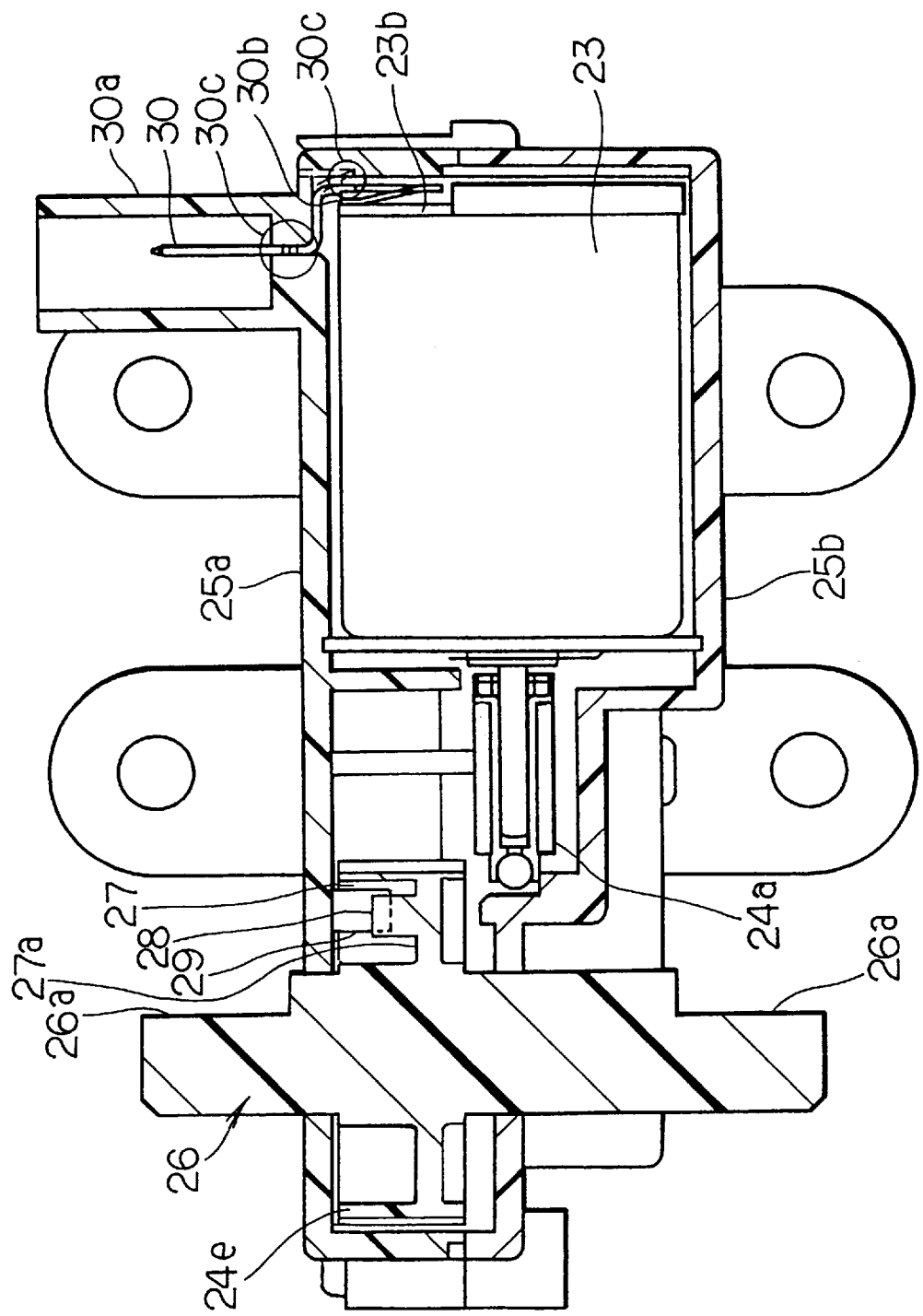
FIG. 5 is a cross-sectional view showing the actuator taken along a line V—V in FIG. 2.
Figure 6:
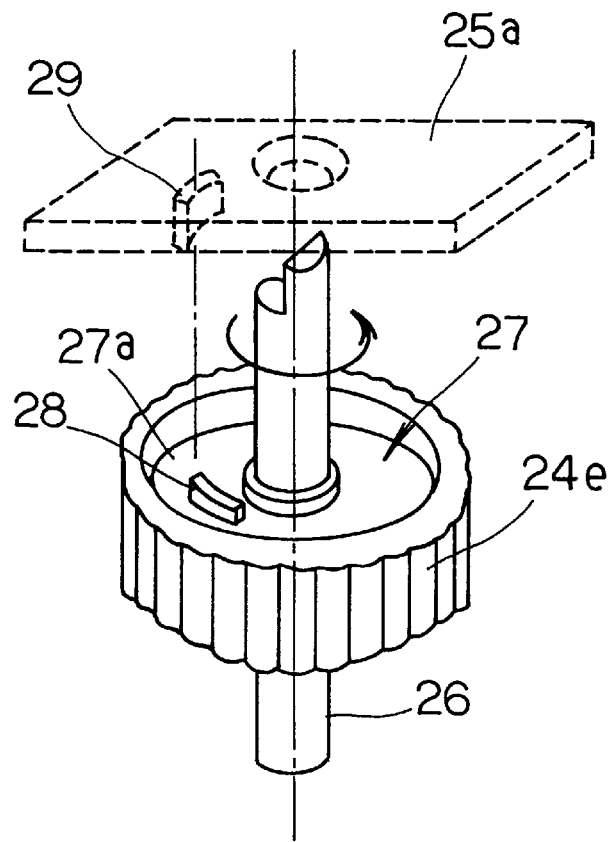
FIG. 6 is a perspective view showing an output shaft and a final stage spur gear of a reduction mechanism used in the actuator.

As shown in FIGS. 5 and 6, an annular depression 27 facing the first housing 25a is formed on the final stage spur gear 24e. On a bottom surface 27a of the annular depression 27, a projection 28 is formed integrally with the spur gear 24e. Another projection 29 is fixedly formed on the first housing 25a, facing the annular depression 27. The worm 24a and spur gears 24b–24e constituting the reduction mechanism are all made of resin.

Figure 7:
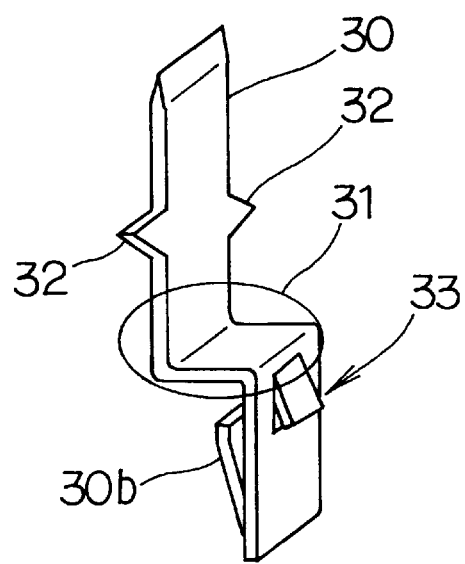
FIG. 7 is a perspective view showing a connector terminal used in the actuator.

As shown in FIG. 5, a metal connector terminal 30 for supplying electric power to the motor 23 is provided on the housing 21a. The connector terminal 30 is angled with a bent portion 31 as shown in FIG. 7. One end of the connector terminal 30 sticks out in a terminal cover 30a, and the other end contacts a motor terminal 23b for electrically connecting the connector terminal 30 to the motor 23. As seen in FIG. 7, the connector terminal 30 includes a contacting portion 30b formed integrally with the terminal 30 which contacts the motor terminal 23b with a spring action. The connector terminal 30 also includes a pair of triangle projections 32 for fixing the connector terminal 30 to a portion 30c of the first housing 25a and a sticking-out portion 33 for fixing the connector terminal 30 to an axial end of the housing 25a. The connector terminal 30 is fixed to the housing 25a by the triangle projections 32, a spring action of the sticking-out portion 33, and a frictional force between the connector terminal 30 and the housing 25a generated by the bent portion 31.

Now, the operation of the actuator according to the present invention will be described below. The motor 23 of the actuator 2 is controlled by a controller 3 to which a signal from a switch 4 indicating driver's intention to open or close the quarter window and a signal from an ignition switch 5 indicating whether the ignition switch is at positions which allow the motor to be operated are input (refer to FIG. 2). The motor 23 is operated according to the signal from a driver only when the signal from the ignition switch 5 indicates that an engine is in operation or an accessory switch is on.

When the signal from the switch 4 indicates to open the quarter window, the motor 23 rotates in a direction to open the quarter window and the projection 28 formed on the final stage spur gear 24e also rotates together with the motor 23. As the projection 28 rotates by a predetermined angle, it (one end) abuts against the fixed projection 29 formed on the first housing 25a, thereby forcibly preventing the motor rotation. The positions of the projections 28 and 29 are predetermined so that they abut each other when the quarter window is fully opened. As the motor 23 is forcibly stopped, electric current supplied to the motor increases. The controller 3 detects the electric current increase and shuts off the current supply to the motor 23 when the current exceeds a predetermined value.

On the other hand, when the signal from the switch 4 indicates to close the quarter window, the motor 23 rotates in a direction to close the quarter window and the projection 28 also rotates together with the motor. When the quarter window comes to the fully closed position, the projection 28 (the other end) abuts against the fixed projection 29, thereby forcibly preventing the motor rotation. This is detected by the controller 3 in the same manner as above, and the current supply to the motor 23 is discontinued. The fully opened position of the first link 21a in FIG. 2 is shown with a solid line and the fully closed position with a dotted line.

Incidentally, to avoid a situation where the quarter window is left open after the ignition switch is turned off, a signal to close the quarter window is automatically generated in the controller 3 when the ignition switch is turned off.

As described above, in the linkage mechanism 21, a pair of the first links 21a are connected to the output shaft 26 at both sides thereof and inserted into the slits 21e of the second link 21b as shown in FIG. 4. The first and second links 21a and 21b are pivotably connected to each other with a spring pin 21d. Therefore, the first links 21a do not drop off from the output shaft 26 as far as the connection between the first and second links 21a and 21b is secured, even when the linkage mechanism 21 as a whole is displaced slidably along an axial direction of the output shaft 26. Accordingly, there is no need to provide any means for fixing the first links 21a to the output shaft 26. This contributes to saving the production cost. This structure of connecting the first links 21a to the second link 21b also provides a high mechanical strength for the linkage mechanism 21 as a whole. The spring pin 21d used for connecting the first links 21a and the second link 21b may be replaced with a rod or a rivet which rotatably supports the first links 21a and is fixedly connected to the second link 21b.

Since the both projections 28 and 29 which forcibly stop the motor 23 when they abut each other are disposed in the housings 25a and 25b and enclosed therein, there is no need to make a part of the linkage abut against a part of the housing to stop the motor 23. Therefore, the possibility of foreign part jamming between the linkage and the housing is avoided. Also, there is no need to provide a potentiometer to detect a rotational angle of the motor. Accordingly, unnecessary increase of the actuator size and production cost is avoided. In addition, since the projection 28 is formed inside of the annular depression 27 of the final stage spur gear 24e, an axial length of the spur gear 24e does not become larger because of the projection 28.

Figure 9:
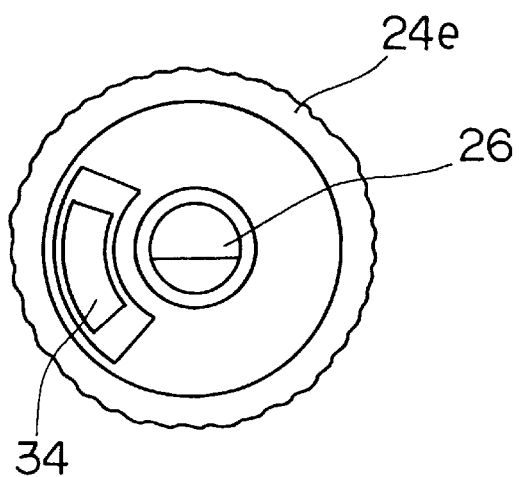
FIG. 9 is a plan view showing a modification of the final stage spur gear shown in FIG. 6.

The projections 28 and 29 abut directly against each other when the motor 23 rotates up to the positions to be stopped in the embodiment described above. In order to alleviate the direct abutting impact, the projection 28 may be modified in a form shown in FIG. 9 in which a cover 34 made of a resilient material such as rubber is disposed on the projection 28. Such a resilient cover may be disposed on the fixed projection 29. For the same purpose, the projections 28 and 29 themselves may be made of a resilient material. By thus alleviating the abutting force of the projections 28 and 29, durability of the reduction mechanism 24 is improved and noise caused by the abutting of the projections can be reduced at the same time.

Though all the gears constituting the reduction mechanism 24 are made of resin in the embodiment described above, they may be made of a metallic material. Also, the integrally made output shaft 26 and final stage spur gear 24e may be made separately. The fixed projection 29 formed on the first housing 25a may be moved to the second housing 25a. The position of the projection 28 is not limited to the position described above, but it may be variably selected. It may be formed on the axial end surface of the spur gear 24e, the annular depression 27 being eliminated, or on the inner surface (not on the bottom surface 27a) of the annular depression 27.

The connector terminal 30 having an angled shape as shown in FIG. 7 is simply inserted into the position shown in FIG. 5. The connector terminal 30 is securely held in the first housing 25a by the triangle projections 32 and a spring action of the sticking-out portion 33. One end of the connector terminal 30 extends to an inner space of the connector cover 30a, and the other end contacts the motor terminal 23b with a spring force of the contacting portion 30b for securing an electrical contact therebetween. Therefore, an assembling process of the connector terminal 30 is much easier, compared with a conventional electrical connection using a lead wire.

Figure 8A:
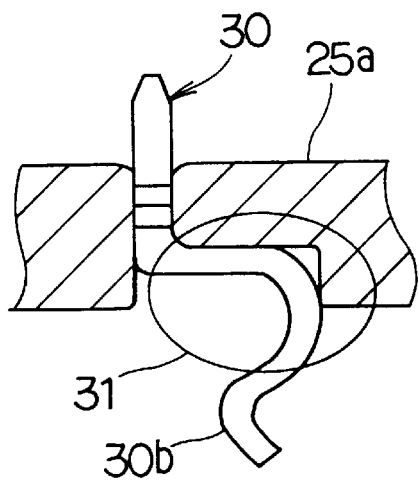
FIGS. 8A–8C are perspective views showing modified forms of the connector terminal shown in FIG. 7.
Figure 8B:
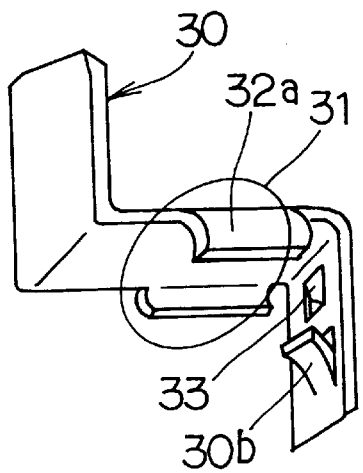
Figure 8C:
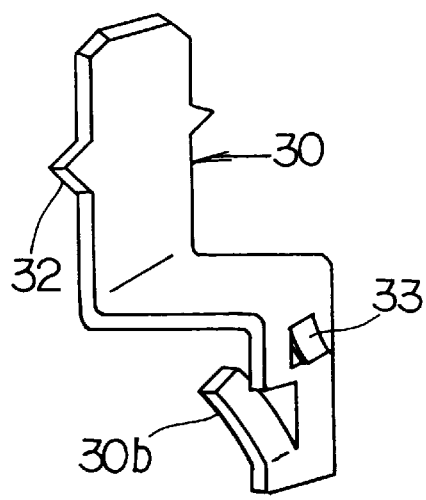

The connector terminal 30 having a crank-angled shape shown in FIG. 7 may be modified as shown in FIG. 8A in which the bent portion 31 has a U-shape or an S-shape. Also, the triangle projection 32 may be replaced with rounded portions 32a as shown in FIG. 8B. The contacting portion 30b which is formed by cutting and raising a center portion of the terminal plate (FIG. 7) may be modified as shown in FIG. 8C in which the contacting portion 30b is formed at one side of the terminal plate. Though the connector terminal 30 is disposed to extend in a radial direction of the motor 23 in the embodiment described above, it may be installed to extend in an axial direction of the motor 23. In this case, the connector terminal 30 may be made integrally with the motor terminal 23b, the triangle projections 32 and the sticking-out portion 33 for fixing the connector terminal 30 to the housing being eliminated. Also, the bent portion 31 may be eliminated, making the connector terminal 30 with a straight shape. In this case, the connector terminal 30 is held in the housing only by the triangle projections 32 and the sticking-out portion 33 without using the spring force of the bent portion 31.

The foregoing embodiment of the present invention is described, assuming it is used for a pivotable quarter window. However, it can be readily used for operating other pivotable windows such as a roof window of a vehicle.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An actuator for opening and closing a pivotable window comprising:

an electric motor;

a housing containing the electric motor therein;

an output shaft for transmitting rotational torque of the electric motor, the output shaft being rotatably held in the housing and extending outwardly from two sides of the housing; and a linkage mechanism connected to the output shaft for pivotally opening and closing the pivotable window, wherein:

the linkage mechanism includes a pair of first links and a second link, the pair of the first links being connected to the extended ends of the output shaft, the second link being pivotally connected to the pair of first links; and a pair of slits for slidably receiving the pair of first links therein are formed on the second link, so that movement of the pair of first links in an axial direction of the output shaft is restricted.

2. An actuator for opening and closing a pivotable window comprising:

a housing;

an electric motor contained in the housing;

a rotational speed reduction mechanism contained in the housing, for reducing rotational speed of the electric motor, the rotational speed reduction mechanism having a train of a plurality of gears which include a first stage gear engaging with the electric motor and a final stage gear;

an output shaft rotatably held in the housing and connected to the final stage gear of the rotational speed reduction mechanism; the output shaft being extended outwardly from two sides of the housing; and a linkage mechanism connected to the output shaft for pivotally opening and closing the pivotable window, wherein:

the linkage mechanism includes a pair of first links, each connected to one of the ends of the extended output shaft, and a second link pivotably connected to the first links; and the second link includes a pair of slits slidably receiving the first links therein, and restricting movement of the pair of first links in an axial direction of the output shaft.

* * * * *